(12) United States Patent
Sibiryakov et al.

(10) Patent No.: US 7,961,982 B2
(45) Date of Patent: Jun. 14, 2011

(54) ROBUST IMAGE REGISTRATION

(75) Inventors: Alexander Sibiryakov, Guildford (GB); Miroslaw Bober, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 919 days.

(21) Appl. No.: 11/454,974

(22) Filed: Jun. 19, 2006

(65) Prior Publication Data
US 2007/0003165 A1    Jan. 4, 2007

(30) Foreign Application Priority Data

Jun. 20, 2005  (EP) .................................. 05253802

(51) Int. Cl.
*G06K 9/32* (2006.01)
(52) U.S. Cl. ........................................ 382/294; 382/107
(58) Field of Classification Search .................. 382/296, 382/107
See application file for complete search history.

(56) References Cited

U.S. PATENT DOCUMENTS

| | | | | |
|---|---|---|---|---|
| 5,613,013 A * | 3/1997 | Schuette | ...................... | 382/124 |
| 2005/0094852 A1* | 5/2005 | Kumar et al. | ................. | 382/107 |
| 2009/0128546 A1* | 5/2009 | Masuda | ........................ | 345/419 |

OTHER PUBLICATIONS

Dufournaud et al. Computer Vision and Image Understanding, Academic Press, San Diego,vol. 93, pp. 175-194, (2004).
Schaffalitzky et al. IEEE, Conf. On Computer Vision, vol. 2, pp. 636-643, (2001) XP-002356224.
Fischler et al. Communications Of The ACM USA, vol. 24, No. 6, pp. 381-395, (1981), XP-002356225.
Srinivasa et al., IEEE Transaction On Image Processing, vol. 5, No. 8, pp. 1266-1271, XP-000595725.
Brown, AMC Computing Surveys, vol. 24, No. 4, pp. 325-376, (1992), XP-000561460.
Chang et al., Rotations And Scale Changes, Pattern Recognition, vol. 30, No. 2, pp. 311-320 (1997).
Li et al., IEEE Transactions Of Image Processing, vol. 4, No. 3, pp. 320-334, (1995).
Guest et al., IEEE Transaction On Pattern Analysis And Machine Intelligence, vol. 23, No. 2, pp. 165-179, (2001).
Hsieh et al., Computer Vision and Image Understanding, vol. 67, pp. 112-130, (2001).
Schmid et al., International Journal Of Computer Vision, vol. 37 No. 2, pp. 151-172, (2000).
Sojka, Faculty of Electrical Engineering and Computer Science, Technical University of Ostrava, pp. 1-23, (2002).
Yeung et al., Proceedings of the 2003 Australasian Conference on Robotics & Automation, (2003).
Wolberg et al. Proc. of IEEE Intl. Conf. on Image Processing, (2000).
Wolberg et al. Proc, SPIE, Automatic Target Recognition, Orlando (2000).
Xie et al., Computer & Geosciences, vol. 29, pp. 1045-1055, (2003).
Mikolajczyk et al. ICCV, (2001).
Chum et al., DAGM2003.

* cited by examiner

*Primary Examiner* — Samir A Ahmed
*Assistant Examiner* — Ruiping Li
(74) *Attorney, Agent, or Firm* — Birch, Stewart, Kolasch & Birch, LLP (57) ABSTRACT

A method of estimating a transformation between a pair of images, comprises estimating local transformations for a plurality of regions of the images to derive a set of estimated transformations, and selecting a subset of said estimated local transformations as estimated global transformations for the image.

35 Claims, 7 Drawing Sheets

ROBUST IMAGE REGISTRATION

The invention relates to a method and apparatus for image registration. Image registration refers to geometric alignment, using for example rotation, translation and scaling, of two or more images. The images may, for example, relate to the same scene taken under different conditions, such as by different sensors, from different viewpoints, or at different times. One of the objectives of image registration is to facilitate analysis of a set of images by presenting them in the same configuration. There are many applications of image registration, including medical imaging, analysis of satellite images and image sequence stabilisation.

Prior art image registration methods include methods based on image intensity distribution, and feature-based methods, using features in the image such as edges, corners, closed-boundary regions etc.

Feature-based image registration methods are often used because the localization of local structural information (features) is in general more accurate than localization based on image intensity distribution. Feature-based approaches can handle complex between-images transformations, such as affine or perspective transformations. Some of the approaches also allow registration of images of different nature. The common drawback of the feature-based methods is that they may fail when some features are missed, for example due to local transformation (distortion) or strong illumination change. The crucial point of all feature-based matching methods is to rely on discriminative and robust feature descriptors that are invariant to all possible transformations between the images.

Due to the diversity of images to be registered and due to various types of possible degradations it is hard to design a universal method applicable to all registration tasks. Every method should take into account not only the assumed type of geometric transformation between the images but also radiometric deformations and corruption by noise. Other design factors include required registration accuracy and further application-dependent requirements.

Nevertheless, the majority of the registration methods consist of the following steps:

Feature detection. Salient and distinctive features (closed-boundary regions, edges, contours, line intersections, corners, etc.) are detected manually or automatically. For further processing, these features are usually represented by their point representatives (e.g. centers of gravity, line endings, distinctive points), which are called interest points.

Feature matching. In this step, the correspondence between the features detected in the source image and those detected in the target image is established. Various feature descriptors and similarity measures along with constraints on spatial relationships among the features are used for that purpose.

Transform model estimation. The type and parameters of the so-called mapping functions, aligning one image (the source image) with another image (the target image), are estimated. The parameters of the mapping functions are computed based on the established feature correspondence.

The detected features in the source and target images can be matched based on image intensity values in their close neighborhoods, the feature spatial distribution, or the feature symbolic description. Some methods, while looking for the feature correspondence, simultaneously estimate the parameters of mapping functions and thus merge the second and third registration steps.

Methods which are based primarily on the spatial relations among the features are usually applied if detected features are ambiguous or if their neighborhoods are locally distorted. The information about the distance between the interest points and about their spatial distribution is exploited. Shih-Hsu Chang et al, "Fast Algorithm For Point Pattern Matching: Invariant To Translations, Rotations And Scale Changes", Pattern Recognition, Vol. 30, No. 2, pp. 311-320, 1997 evaluates the number of features in the target image that, after a particular transformation, fall within a given range next to the features in the source image. The transformation parameters with the highest score were then set as a valid estimate.

Manjunath et al, "A contour-based approach to multisensor image registration", IEEE Transactions on Image Processing, vol. 4, no. 3, pp. 320-334, March 1995 presents two contour-based methods which use region boundaries and other strong edges as matching primitives. The first contour matching algorithm is based on the chain-code correlation and other shape similarity criteria such as invariant moments. Closed contours and the salient segments along the open contours are matched separately. This method works well for image pairs in which the contour information is well preserved, such as the optical images from Landsat and Spot satellites. They propose an elastic contour matching scheme based on the active contour model. Using the contours from the optical image as the initial condition, accurate contour locations in the SAR image are obtained by applying the active contour model.

As an alternative to the methods exploiting the spatial relations, the correspondence of features can be estimated using their description, which preferably should be invariant to the expected image deformation. Features from the source and target images with the most similar invariant descriptions are paired as the corresponding ones. The choice of the type of the invariant description depends on the feature characteristics and the assumed geometric deformation of the images. While searching for the best matching feature pairs in the space of feature descriptors, the minimum distance rule with thresholding is usually applied. Guest et al, "Robust point correspondence applied to two- and three-dimensional image registration", IEEE Transaction on Pattern Analysis and Machine Intelligence 23 (2001) 165-179, proposes selecting features according to the reliability of their possible matches. The work Hsieh et al, "Image registration using a new edge-based approach", Computer Vision and Image Understanding 67 (1997) 112-130, uses the angle histogram computed on line feature points for the compensation of rotation difference. After the removal of the rotation difference, the feature point correspondence is found by means of cross-correlation.

U.S. Pat. No. 6,738,532 B1 describes a method of image registration based on reduced resolution transform space. Rotation and translation parameters are recovered in a hierarchical framework. In coarse resolution rotation angle is recovered by applying plurality of rotations and selecting the angle giving the best similarity between images. Translation is recovered in similar way using discrete set of translations between the images aligned by rotation. Fine alignment is achieved by local control point matching.

U.S. Pat. No. 6,373,970 B1 describes another method of registering rotation, scale and translation between images. This method is another variant of using Fourier phase matching and it is applied globally to both source and target images.

U.S. Pat. No. 6,694,064 B1 describes interest point-based method of creating aerial image mosaics. The task of point matching is significantly simplified by using external information on geo-reference. Such information helps to determine image overlap area and gives strong constraints on search.

US 2003/0030638 describes a method of perspective registration of images containing 2D-objects. The method is based on robust estimation of perspective transformation (homography) between views based on high-level features (lines, parallel pairs, intersections).

The present invention addresses the problem of registering two images obtained under unknown conditions (including acquisition at different time from different points of view, and possibly with different sensors), where conventional approaches based on feature correspondence or area correlation are likely to fail or provide unreliable estimates.

The main drawback of all state-of-the-art interest point detection methods is inaccuracy of the interest point location due to their inaccurate detection (i.e. localization error). The localization error leads to ineffective feature matching due to low local similarity measure. According to an aspect of the present invention, a local matching using a modified log-polar transform is introduced. This can reduce localization errors by excluding point neighborhood from the analysis.

Almost all registration methods make an a priori assumption about image scaling factor. Usually the scaling factor belongs to [0.5.2] interval. While most practical cases satisfy this assumption, some registration tasks (especially in cases of different sensors or multi-focus applications) may require more variability in the scale. Methods using log-polar transform are less sensitive to the scaling factor. According to Wolberg et al's "Image Registration For Perspective Deformation Recovery", Proc. SPIE, Automatic Target Recognition, Orlando, 2000, methods using log-polar transform in the frequency domain, such as described in Xiea et al, "An IDL/ENVI implementation of the FFT-based algorithm for automatic image registration", Computers & Geosciences 29 (2003) 1045-1055, could successfully register images with a scaling factor of up to 2. Another method described in Wolberg et al's "Image Registration For Perspective Deformation Recovery", Proc. SPIE, Automatic Target Recognition, Orlando, 2000 is capable of registering an affine model with global scaling factor less than 10. This method works in the image domain and uses a full 4D-search in translation, rotation and scale-space, which is computationally expensive. According to an aspect of the present invention, the log-polar transform is used locally at each interest point. This gives a possibility for recovering not only large scaling factors (images with the scaling factor up to 8 can be registered), but also more complex transformations (e.g. perspective model). A set of simple transformations, which can be registered easily, locally supports more complex transformations, which are difficult to register due to their complexity.

Many registration methods, especially those based on interest point matching, use a priori knowledge of the geometric relation between images (e.g. approximate overlapping area, translation, rotation angle . . . ). Such constraints help to select a subset of target interest points as possible matches for one particular reference point. For example, in robust estimation methods (such as RANSAC) it is usually not possible to search all feature matches due to the combinatorial complexity, so additional constraints are necessary in such a case. Embodiments of the present invention do not need to rely on any specific constraints regarding transformation. This is the most universal case, when the method is capable of registering the images without any prior knowledge about the transformation between them.

The majority of the known registration methods provide inaccurate estimates of the geometric transformation and consequently give poor registration. This is because in many feature-based registration methods, source feature points (i.e. the feature points in the first images) are iteratively selected from a feature-point list without regard to how these points are distributed within an image. The main drawback of such an approach is that spatial relations between source points are lost when they are placed into the list. For example, a big proportion of source points may be clustered in the same part of the image. This may lead to poor registration results, when the transformation model interpolates well only a part of the image. According to an aspect of the present invention, all source points are rearranged so that a first few points cover a significant part of the image, which results in better interpolation properties of the recovered transformation model.

Aspects of the present invention are set out in the accompanying claims.

According to one aspect of the present invention, a global parametric transformation between images (e.g. perspective, affine or other transformation) is estimated from a set of local estimates of a rotation-scale-translation (RST) transformation. These local RST transformations are estimated from a corresponding pair of interest points, using a specially modified correlation in log-polar coordinates. A sub-set of local transformations is selected by a robust estimation method and a global transformation, which is not biased by outliers, is computed from it.

In the first step, interest (feature) points are detected in both source and target images. This is achieved by detecting local maxima of the source's and target's image corner strength map. Two lists are created with source and target feature points. The points in the lists are arranged (sorted) according to their corner strength measure, so that all prominent features are located towards the top of the lists, but also according to their relative locations within the images. The objective is to obtain a good spatial distribution of the feature points in the image, so that points close in a list are located as far as possible from each other in the image. In one embodiment, this is achieved by tiling the image and sorting feature points in each tile independently, before constructing the main lists.

In the second step, local RST transformations are estimated. This can be achieved by processing in the frequency domain or in the image domain. Firstly, a local pre-processing is performed for image regions centred at each interest point. A modified log-polar transform, which is insensitive to point localization errors, is applied. This transforms a circular image region into a rectangular image. These images are further pre-processed by either computing a FFT or computing integral images, depending whether the frequency domain or in the image domain processing is used. These images will be referred to as logFFT or logInt local descriptors.

To find correct matching pairs a voting procedure is used. Each possible pair of points (one from the source and one from the target image), together with their logFFT or logINT local descriptors, is considered and parameters of local RST transformation are recovered. Each point pair votes for these recovered parameters and clusters of votes are then used to identify correctly matched point pairs.

When a sufficient number of points are matched the algorithm generates several search constraints. A robust estimator, for example RANSAC, is then applied to the matched points to estimate the global transformation parameters. The overlapping area and search constraints are estimated and stored. The matching continues iteratively with the new set of constraints, resulting in faster processing and more accurate results. The matching terminates when a set of termination criteria, is satisfied.

Advantages of embodiments of the present invention include the following.

High accuracy and robustness is achieved by a combination of the local estimation of the RST transformation parameters in a modified log-polar space, control of the selection of the feature points and the iterative global refinement by a RANSAC estimator.

Knowledge about geometric relation between images is not required. Embodiments of the present invention are capable of registering images without any a priori knowledge about the transformation between them. However, if known, search constraints can be incorporated to further speed-up processing.

Fast convergence results from the multi-resolution interest point detection strategy combined with importance sorting based on feature strength and spatial relationship. Interest points may be detected using multiple image scales, thus ensuring that only significant singular points are kept for feature matching. Spatial re-arranging produces a point list where neighbour points in the list belong to different image tiles, located as far as possible from each other. This ensures that even a few points from the list cover significant part of image. Sorting the points according to their strength measure ensures that only significant and recognisable under different conditions image structures are matched first, which leads to extremely fast convergence of the registration algorithm, usually after only a few iterations.

Embodiments of the invention offer strong robustness to different image distortions, such as illumination or intensity variations or strong local distortions. This is achieved thanks to local matching that gives an over-complete set of transformation estimates, from which the global transformation is derived. The similarity measures such as correlation coefficient or phase correlation that are used for local registration are invariant to additive and multiplicative intensity changes, so images taken under different conditions with non-linear intensity difference can be registered.

Robustness to image changes or multiple regions undergoing different transformations. A global image transformation model is estimated from a set of local transformations. A clustering-based approach is then combined with a robust estimator is applied to find an outlier-free subset of local registration models and a set of correspondent points, which can be used directly in a standard least-square estimation procedure, resulting in an accurate (subpixel accuracy) transformation model.

Embodiments of the invention will be described with reference to the accompanying drawings of which:

FIGS. 6(a) and (b) illustrates matching of feature points;

FIGS. 8(a) and (b) illustrate matching on the basis of log polar images;

FIGS. 11(a) and (b) illustrate two similarity measures in the form of an image and a surface;

According to an embodiment of the invention, a first, source, image is registered with a second, target image. The source and target images are taken under different conditions, but no other a priori information regarding relationships between the two images is required. The method outputs an estimated projective transformation between the source and target images, together with a set of interest points in each of the source and target images and the correspondence between these sets of interest points.

Figure 1:
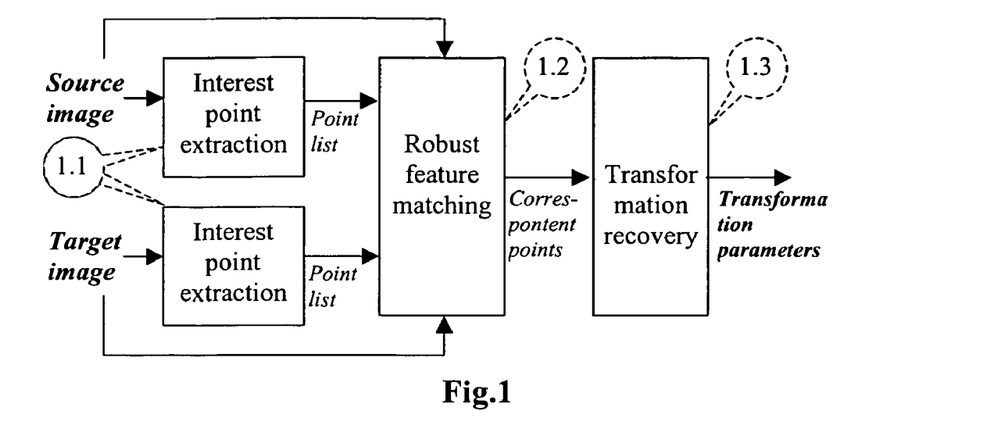
FIG. 1 is a block diagram of an embodiment of the invention.

As shown in FIG. 1, the method involves the steps of: interest point extraction in the source and target images (step 1.1); matching of the interest points (features) in the source and target images (step 1.2); and estimation of the transformation between the source and target images using the matched interest points (step 1.3).

More specifically, the method of the embodiment involves the steps of:

1. Extracting interest points (using scale space and a corner detector).
2. Ordering the interest points, according to corner strength and location.
3. Taking a circular region around each interest point, and transforming to (modified) log polar space.
4. Matching interest points using the modified log polar transform and a similarity measure, on the assumption of a local rotation scale translation (RST) transform. Using a voting scheme based on a range of rotation and scale values to identify the best match.
5. Rejecting outliers.
6. Using (subsets) of the matched interest points to determine a perspective transformation.

In this embodiment, as discussed in more detail below, interest points are extracted using a scale-space corner detector, the matching of interest points is robust point matching using a log-polar transform and also outlier rejection, and estimation of the transformation involves global perspective transformation recovery using least-squares estimation.

In this embodiment, the features of interest are corners, and the interest points are extracted using a corner detector. A discussion of methods for detecting corners in images can be found in E. Sojka's "A new algorithm for direct corner detection in digital images", Technical report, Faculty of Electrical Engineering and Computer Science, Technical University of Ostrava, September 2002. Furthermore, the interest points in the source and target images are extracted using a scale space representation. A scale space representation is a set of different levels of resolution of an image. Mikolajczyk & Schmid's, "Indexing based on scale invariant interest points", ICCV, 2001 contains a discussion of scale space representations, in connection with interest points.

Figure 2:
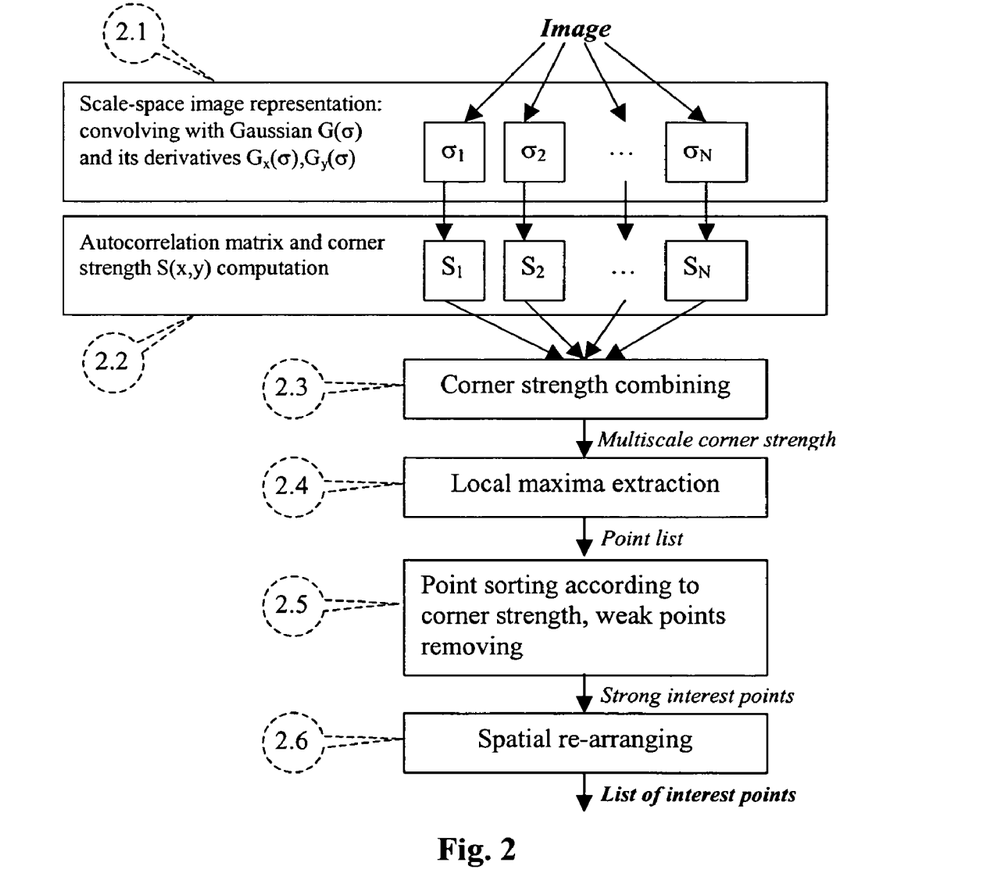
FIG. 2 is another block diagram of an embodiment of the invention.

The interest point extraction method is illustrated in FIG. 2.

The method is based on based on autocorrelation function of the signal, which measures the greyvalue difference between a window and windows shifted in directions parallel to image columns and rows:

$$f(x, y, \Delta x, \Delta y) = \sum_{(x_k, y_k) \in W} G(x_k, y_k)(I(x_k, y_k) - I(x_k + \Delta x, y_k + \Delta y))^2, \quad (1)$$

where $I(x,y)$ is the image function, $(x_k, y_k)$ are points in the window $W$ centred on $(x,y)$, $G(x_k, y_k)$ is Gaussian function used for weighting image intensities. From the autocorrelation function (1) an autocorrelation matrix (2) is derived using first-order approximation based on Taylor expansion. This matrix averages derivatives of the signal in a window $W$ around a point $(x,y)$:

$$A(x, y) = \begin{bmatrix} \sum_{(x_k, y_k) \in W} G(x_k, y_k)(I_x(x_k, y_k))^2 & \sum_{(x_k, y_k) \in W} G(x_k, y_k)I_x(x_k, y_k)I_y(x_k, y_k) \\ \sum_{(x_k, y_k) \in W} G(x_k, y_k)I_x(x_k, y_k)I_y(x_k, y_k) & \sum_{(x_k, y_k) \in W} G(x_k, y_k)(I_y(x_k, y_k))^2 \end{bmatrix} \quad (2)$$

This matrix reflects properties of the local neighbourhood. If this matrix is of rank two that is both its eigenvalues are large, an interest point is detected. A matrix of rank one indicates an edge and a matrix of rank zero indicates a homogeneous region. To avoid extraction of the eigenvalues of the matrix A, the strength of the interest points is measured by the parameter-free measure (3), which was described in Sojka et al, "A new algorithm for direct corner detection in digital images", Technical report, Faculty of Electrical Engineering and Computer Science, Technical University of Ostrava, September 2002:

$$S(x, y) = \frac{\det A(x, y)}{\operatorname{trace} A(x, y)} \quad (3)$$

Computing of (2) is based on scale-space representation of an image and its derivatives:

$I(x,y,\sigma) = G(\sigma) * I(x,y),$ $I_x(x,y,\sigma) = G_x(\sigma) * I(x,y),$ $I_y(x,y,\sigma) = G_y(\sigma) * I(x,y), \quad (4)$ where $G(\sigma)$, $G_x(\sigma)$, $G_y(\sigma)$ are the Gaussian kernel and its derivatives.

Scale-space derivatives (4) are used to compute the scale space autocorrelation matrix $A(x,y,\sigma)$ (block 2.1). For each pixel of the original image $I(x,y)$ a scale-space representation (block 2.2) of the strength measure $S(x,y,\sigma)$ is computed using (3). Another Gaussian kernel with $\sigma = \sigma'$ is used to weight the derivatives summed over the window. Then several strength measures corresponding to different scales $\sigma_1, \sigma_2, \ldots \sigma_n$, are combined into final strength measure (block 2.3). The simplest method of combining is pixel-by-pixel multiplication of the strength measures:

$$S(x, y) = \prod_{\sigma_1, \sigma_2, \ldots} S(x, y, \sigma) \quad (5)$$

This strength measure emphasizes only those interest points which are invariant to selected scale levels given by $\sigma_1, \sigma_2, \ldots \sigma_n$ an parameters.

Figure 3:
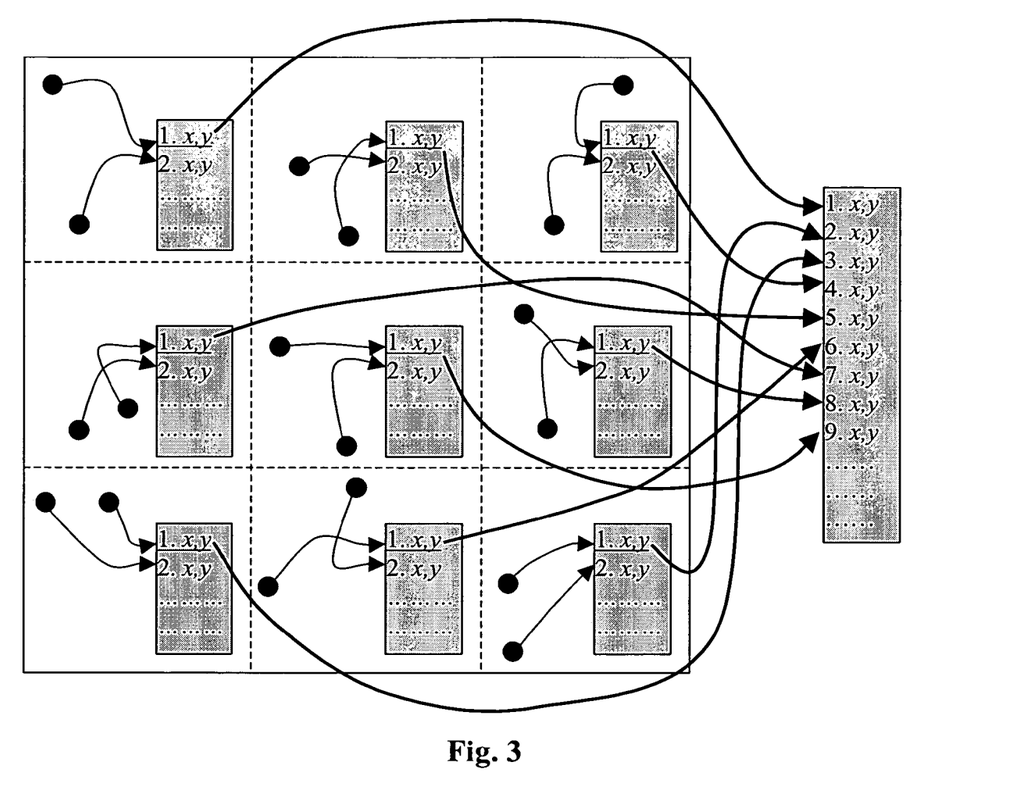
FIG. 3 illustrates ordering of feature points in an image.

All possible interest points are detected as local maxima of the strength measure (block 2.4). After this procedure an initial point list is formed. An importance sorting procedure, based on feature strength and spatial relationship is applied to the initial lists. The points in this list are sorted in scan line order. The points are then sorted according to strength measure (block 2.5), so that all strong features are located on the top of the list. Weak features from the end of the list whose strength measure is less than a threshold are removed. To ensure good spatial distribution of the points in the image, the list is rearranged so that neighbour points in the list belong to different image tiles, located as far as possible from each other (block 2.6). This procedure is shown in FIG. 3.

In a preferred embodiment, three scale levels with the following parameters: $\sigma_1=0.5$, $\sigma_2=1$, $\sigma_3=2$, $\sigma'_i=2\sigma_i$ are used. For the local maxima search an 11×11 pixel window is used. The threshold for accepting local maxima as an interest point is chosen to be 10. For the spatial re-arranging the image is divided into tiles of size equal to 256 pixels (both width and height).

After the interest points in the source and target images are extracted as described above, local point matching is carried out, to determine which interest points in the source image correspond to which interest points in the target image. This is carried out using local alignment (ie local to the interest point), and is based on matching of a log-polar transformation of regions centred on the interest points in the images.

Figure 4:
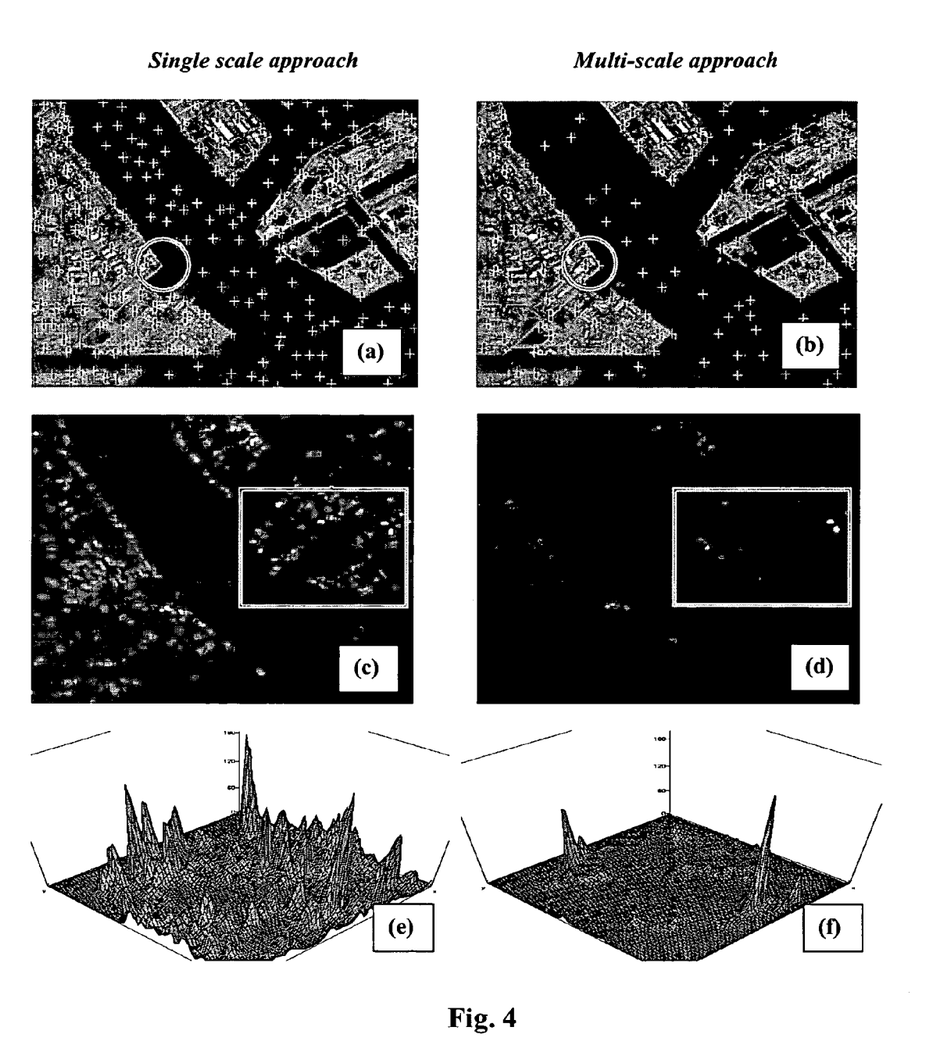
FIGS. 4(a) to (e) show feature points in an image and corresponding strength measures comparing a single scale approach and a multiscale approach.

FIG. 4 shows an example of multi-scale interest point extraction compared with result of conventional (single scale) extraction method. For the single scale version only one Gaussian kernel with $\sigma_1=0.5$ was used. In the multi-scale implementation, the three scale level parameters, the window for the local maxima search and the threshold for accepting local maxima are as above.

FIGS. 4a, c and e represent a single scale approach, and FIGS. 4b, d and f represent a multiscale approach. In FIGS. 4a and 4b, the crosses indicate interest points. FIGS. 4c and d show the strength measures as images. FIGS. 4e and f show the strength measures as surfaces, corresponding to the rectangular areas in FIGS. 4c and 4d.

The comparison of single- and multi-scale versions shows:
Many noisy interest points are suppressed using multi-scale approach;
Multi-scale approach preserves small local corners;
Multi-scale approach detects significant corner features, (for example, referring to the circular area in FIG. 4(a),(b)), the multiscale approach detects a noticeable corner, which is missed by the sample-single scale approach.

Analysis of the results of point matching, (using a method described later), shows benefits from the multi-resolution feature detection and the importance sorting based on feature strength and spatial relationship because the strongest features are matched first with low probability of false matches, and the first few corresponding point pairs have good spatial coverage of the overlapping area of the images.

The point matching procedure can be automatically interrupted when a sufficient number of points is matched. The properties mentioned above ensure reliable and robust results of the subsequent steps of the image registration.

After the interest points in the source and target images are extracted as described above, local point matching is carried out, to determine which interest points in the source image correspond to which interest points in the target image. This is carried out using local alignment (ie local to the interest point), and is based on matching of a log-polar transformation of regions centred on the interest points in the images.

The robust local point matching relies on two assumptions: (1) the images contain detectable features and a sub-set of these features is common in both images, and (2) both images can be locally aligned by a four parameter motion model (geometric transformation).

To find correct matching pairs from interest points that are extracted in both images under registration, a voting approach similar to the Generalized Hough Transform is used. For each possible pair of points, small image regions containing these points are considered and parameters of local RST transformation between these regions are estimated. Each point pair votes for these recovered parameters and clusters of votes are then used to identify correct point pairs. To obtain a similarity measure between two points, only a four-parameter model is used, including translation, rotation and scale. It was found it gives an accurate approximation of the local transformation. The translation between the regions is derived directly from the point coordinate difference. Rotation and scale are considered as variable parameters, so the region-similarity measure depends only on these two variables.

Figure 5:
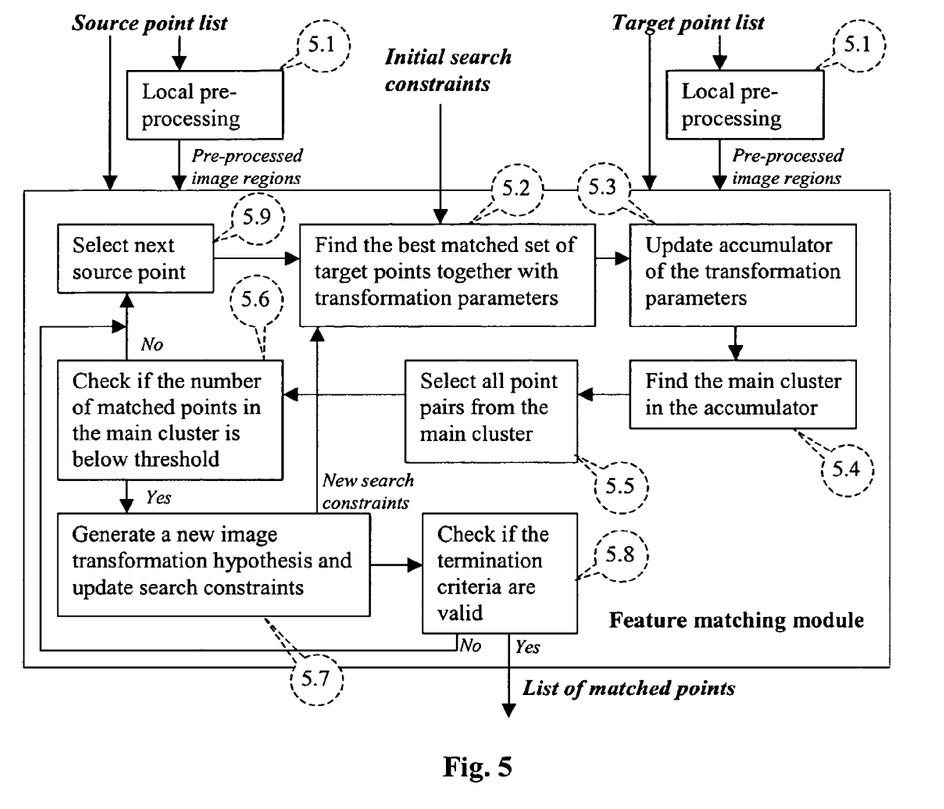
FIG. 5 is another block diagram of an embodiment of the invention.

The workflow of the method is shown in FIG. 5 and its main blocks are summarised below, followed by a more detailed explanation of some of the steps of the method.

The general strategy of the method is feature-based while to match a similarity between individual points, an area-based approach is used. The method is compatible with any area-based similarity measure, including state of the art normalized cross-correlation and phase correlation techniques.

Local pre-processing (step 5.1) is performed for circular image regions centred at each interest point. First a modified log-polar transform is applied, as described below, transforming a circular region into a rectangular region. Further pre-processing depends on what kind of area-based similarity measure is used:

For computation of the correlation coefficient, two floating-point 2D-arrays, containing window average value and variance, are created. These 2D-arrays are computed using a well-known technique based on integral images.

For computation of phase correlation the Fast Fourier Transform is applied.

Search constraints are used to reduce computational cost. In the proposed method the search constraint is an approximate mapping from source image point to target image region. Such constraints help to select a subset of target interest points as possible matches for one particular source point in step 5.2.

For a particular source point the constraints can be empty, this means that the point does not belong to the image overlapping area. Such a point is not selected for the matching in the step 5.9.

The proposed method does not need to rely on any specific initial search constraints (FIG. 5). There may be no a priori constraints, in which case a full set of target interest points is considered as candidate matches for a source point. This is a most universal case, when the method is capable to register images without any a priori knowledge about transformation between them. However, if some prior constraints are know, they can be incorporated in the method (step 5.2), resulting in a reduction in the computational load. Such constraint may come from an a priori knowledge about approximate image transformation model and model parameters.

When a sufficient number of points is matched (step 5.5 and 5.6) the proposed algorithm generates a posteriori search constraints (step 5.7). The matched points are used to estimate transformation model (robust estimation methods are used), from which the overlapping area and search constraints are updated. The matching continues with the new constraints resulting in faster processing.

Step 5.8 determines when the matching process should be finished. As described above the algorithm iteratively updates a set of corresponding points and the transformation model parameters. The estimation process terminates when one of the following conditions is fulfilled:

All source points, have been matched

A sufficient number of source points have been matched and they cover a significant part of the estimated image overlapping area.

The transformation parameters are stable (have not changed) during several recent iterations.

Step 5.2 performs robust matching based on a voting scheme as follows.

Let $(x_i, y_i)$, $i=1 \ldots N_1$ and $(x_j, y_j)$, $j=1 \ldots N_2$ be the two sets of interest points detected on two given images, where $N_1$ and $N_2$ are the total numbers of points in the source $I_1(x,y)$ and in the target $I_2(x,y)$ image respectively. For each point pair $(i,j)$, satisfying the search constraints, a function of a similarity measure $C_{ij}(\theta, s)$ depending on rotation angle $\theta$ and scale s is computed. This similarity function is computed for discrete values of the parameters:

$$\theta_k = \frac{2\pi k}{N_\theta}, \quad (7)$$
$$k = 0, \ldots, N_\theta - 1$$

$$s_l = S(l), \quad (8)$$
$$l = 0, \ldots, N_s - 1$$

where $N_\theta$, $N_s$ determine a number of discrete values in rotation-scale parameter space. In (8) $S(\ldots)$ is a function that maps the scale value from the $[0, N_s-1]$ interval into a set of discrete values $s_1$.

Once the similarity function over a set of parameter values (7), (8) is computed, the values giving the best similarity measure are selected:

$$(\theta^*, s^*)_{ij} = \underset{k,l}{\operatorname{argmax}} C_{ij}(\theta_k, s_l), \quad (9)$$

or in terms of indices:

$$(k^*, l^*)_{ij} = \underset{k,l}{\operatorname{argmax}} C_{ij}(\theta_k, s_l) \quad (9^*)$$

We repeat (9) for all pairs $(i,j)$, $j=1 \ldots N_2[i]$, and select a set of M candidates $j_1, j_2, \ldots j_M$ with highest similarity measure:

$$C_{ij1} \geq C_{ij2} \geq \ldots \geq C_{ijm} \geq C_{ij}, \text{ where } j \in \{j_1, j_2, \ldots j_M\}$$

Figure 6:
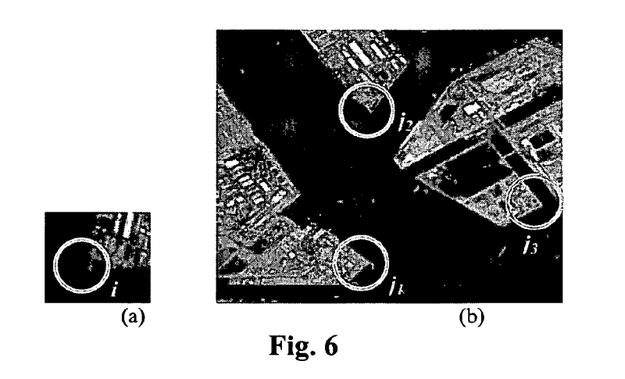

Keeping several candidates (M>1) works better compared to keeping only the best match (M=1), because the correct match does not always result in the highest similarity measure. FIG. 6 shows an example of the image fragments, which are likely to give high similarity measure. As shown in FIG. 6, three possible candidates $j_1, j_2, j_3$ give high similarity measure for i-th interest point. The similarity measure for the true pair $(i, j_2)$ may not be the highest.

The reasons for this could be significant temporal or viewpoint changes. So, several best candidates are kept, and the voting procedure helps to resolve any ambiguities.

The voting scheme itself (block 5.3) is organized as 2D-array $A(k,l)$ accumulating evidence about best similarity measures (9) for all source interest points ($i=1 \ldots N_1$):

$$A(k^*_{ij}, l^*_{ij}) \leftarrow A(k^*_{ij}, l^*_{ij}) + 1, j \in \{j_1, j_2, \ldots j_m\} \quad (10)$$

Correct matches generate a cluster (peak in the accumulator); the location of the cluster corresponds to the rotation and scale parameters (block 5.4):

$$(k^{}, l^{}) = \underset{k,l}{\mathrm{argmax}} A(k, l) \qquad (11)$$

In a preferred embodiment the width and height of the rotation-scale accumulator are chosen to be power of 2 for efficient implementation of the FFT and the following values are used: $N_s=32$, $N_\theta=64$, and three best candidates (M=3) are kept for each source point in the point matching process.

Figure 7:
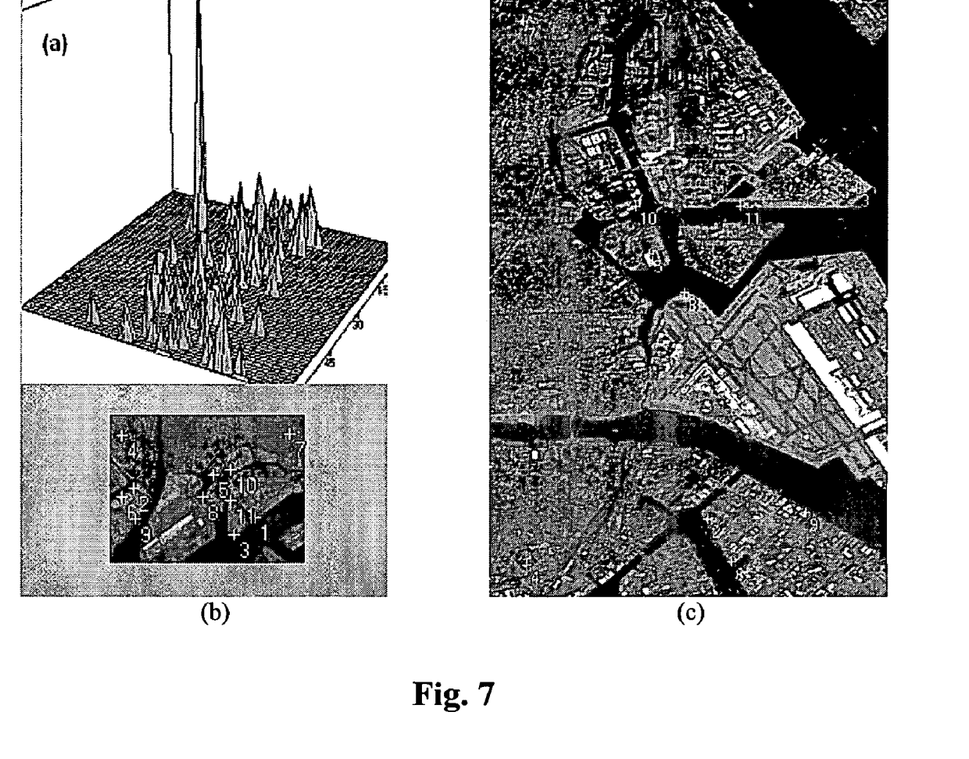
FIGS. 7(a) to (c) illustrate matching of feature points and a corresponding accumulator for a voting procedure.

After obtaining the peak location, all possible interest points pair are checked and only those pairs that contribute to the cluster are stored for the further processing (block 5.5). FIG. 7 shows an example of this step.

FIG. 7 shows initial interest point matching using clustering in the parameter space. FIG. 7(*a*) shows clusters in the rotation-scale parameter space; FIGS. 7(*b*),(*c*) show point pairs contributing to the main cluster in the parameter space; FIG. 7(*b*) is the reference image; FIG. 7(*c*) is the target image. Note the large transformation between the images (scale=4, rotation=90°).

Referring to the above summary, the step of the pre-processing including modified log-polar image transformation is described below.

The log-polar transform is a well-known space-variant image encoding scheme used in some computer vision systems [Yeung and Bames, "Active Monocular Fixation using the Log-polar Sensor", Proceedings of the 2003 Australasian Conference on Robotics & Automation, 2003]. Transformation to log-polar coordinates $(\alpha,\rho)$ is used to handle mutual image rotation and scaling in a uniform way [Wolberg et al, "Robust Image Registration Using Log-Polar Transform", Proc. of IEEE Intl. Conf. on Image Processing, September 2000]. This transform is applied to all image regions centred at an interest point $(x_i, y_i)$:

$$x = x_i + r \cos \alpha \qquad (12)$$

$$y = y_i + r \sin \alpha$$

where $$r = e^\rho \qquad (13)$$

Actually, the transformation (12), (13) is the inverse log-polar transform, which is used in practice to implement the forward transform.

Suppose the target image is the reference image rotated by angle $\theta^*$, scaled by factor $s^*$ and translated by some shift parameters. Then the transform (12) for the target image can be written as follows:

$$x' = x'_i + r^* \cos(\alpha + \theta^*) \qquad (14)$$

$$y' = y'_i + r^* \sin(\alpha + \theta^*)$$

where $(x'_i, y'_i)$ is a location of interest point corresponding to $(x_i, y_i)$, and $$r^* = e^{\rho + \ln s^*} \qquad (15)$$

Expressions (14), (15) show that every scaling and rotation about the origin of (x,y)-coordinates is represented by a shift in $(\alpha,\rho)$-coordinates. This is demonstrated in FIG. 8.

Figure 8:
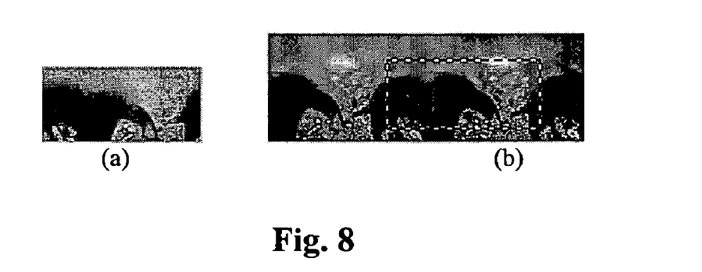

FIG. 8 (*a*) shows the log-polar transform of the reference image from FIG. 7(*b*) around the third interest point; FIG. 8(*b*) shows the log-polar transform of the target image from FIG. 7(*c*) around the third interest point. The dashed rectangle shows the result of matching of image (a) with image (b) by usual cross-correlation search. The maximal correlation coefficient is equal to 0.80. The position of the rectangle corresponds to rotation angle and logarithm of scale. To simplify the search along the periodic $\alpha$-axis in the target image the $[0;4\pi)$ interval for $\alpha$ values is used.

Figure 9:
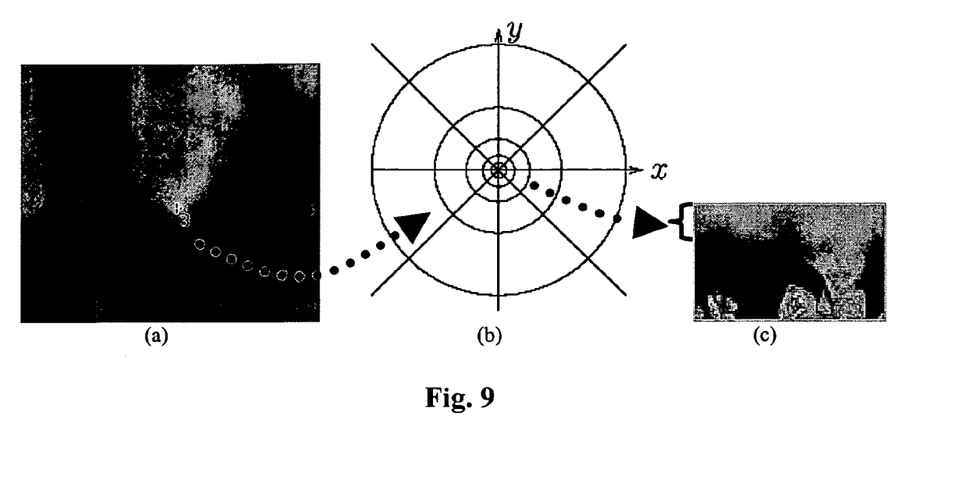
FIGS. 9(a) to (c) illustrate the log polar transform.

Corner localisation error leads to large uniform area in log-polar transformed image. FIG. 9(*a*) shows the example of interest point whose location shifted from the real corner in image; FIG. 9(*b*) shows the log-polar transform maps radial lines and concentric circles into lines parallel to the coordinate axes; FIG. 9(*c*) shows the result of log-polar transform for the image from FIG. 9(*a*). Note the large uniform area on the top of the image.

Figure 10:
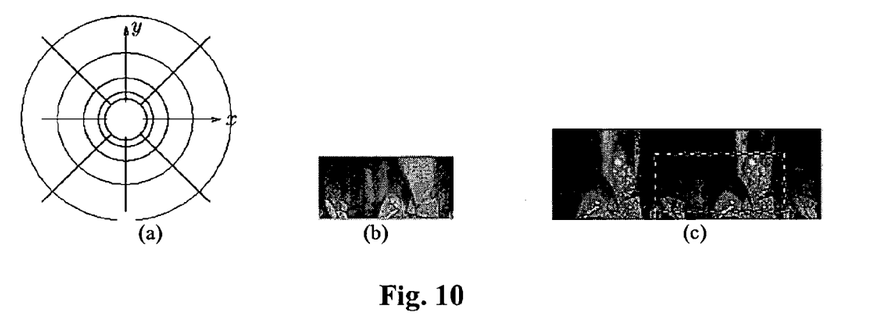
FIGS. 10(a) to (c) illustrate a modified log polar transform of an embodiment of the invention.

Modified log-polar transform. FIG. 10(*a*) shows the modified transform maps radial lines and concentric circles into lines parallel to the coordinate axes, but does not take into account the area near the coordinate system origin; FIG. 10(*b*) shows the transform of the reference image from FIG. 7(*b*) around third interest point (compare with FIG. 8(*a*)); FIG. 10(*c*) shows the transform of the target image from FIG. 7(*c*) around third interest point (compare with FIG. 8(*b*)). The dashed rectangle shows result of matching of image (b) with image (c) by usual cross-correlation search. The maximal correlation coefficient is equal to 0.88.

In the proposed method the log-polar transform is further improved by shifting the zero-level of the radial coordinate. The main rationale for this is that the interest point detector does not always give the real location of corners. The location of an interest point may be randomly shifted from the location of the real corner, as shown in FIG. 9a where the location of the interest point is shifted from the real corner in the image (FIG. 9(*a*)). This leads to a large uniform area in the log-polar image (FIG. 9(*c*)), because the transform maps central circles (dark area in FIG. 9(*b*)) and peripheral circles into the same number of samples. This uniform area does not contain new information about the image region, and its contribution to the similarity measure is low or can even be negative. So, the modified log-polar transform starts from a non-zero radial value $r_0$ (FIG. 10(*a*)) and the transformation still looks like (12), (13), but the expressions for r and r* are:

$$r = e^\rho + r_0 \qquad (13^*)$$

$$r^* = e^{\rho + \ln s^*} + r_0 \qquad (15^*)$$

This modification leads in practice to a significant improvement of point matching results. FIG. 10(*b*,*c*) shows an example of point matching using the modified log-polar transform. The same interest point pair as the one in FIG. 8 was used. While the matching results (rotation and scale) are similar, the peak in the similarity measure (correlation coefficient) is much more prominent for the modified log-polar transform. This property of the modified transform is systematic, and it leads to more robust point matching when the interest point detector gives slightly different point locations due to viewpoint and temporal changes in images.

In the preferred embodiment the value $r_0=5$ pixels is used for the parameter defining the shift of the origin of the modified log-polar transform, and the parameters of the inverse modified log-polar transform are chosen so that the dimensions of the log-polar image are equal to dimensions of rotation-scale accumulator: $m0=N\theta$, $mmax=N\theta-1$, $n0=Ns$, $nmax=Ns-1$.

The computation of the log-polar transform is performed very efficiently by using pre-computed look-up tables for the equations (12), (13*) and using bilinear interpolation for pixels with non-integer coordinate values:

$$I_{lp}(n,m) = I_b(x_i + L_x[n,m], y_i + L_y[n,m]) \qquad (16)$$

where $I_{lp}$ is log-polar image; $I_b$ is the original image; index b means that values with non-integer coordinates are obtained using bilinear interpolation; $(x_i, y_i)$ are coordinates of an interest point, $L_x$, $L_y$ are look-up tables for the inverse modified log-polar transform:

$$L_x[n, m] = (e^{\rho_m} + r_0)\cos\alpha_n \quad (17)$$

$$L_y[n, m] = (e^{\rho_m} + r_0)\sin\alpha_n$$

$$\rho_m = \frac{m}{m_0},$$

$$m = 0, \ldots, m_{max}$$

$$\alpha_n = 2\pi \frac{n}{n_0},$$

$$n = 0, \ldots, n_{max}$$

In (17) $m_{max}$, $n_{max}$ are parameters defining size of the resulting image; $m_0$, $n_0$ are parameters defining angular and radial resolutions of the log-polar image.

The function (8) can now be specified from (15) and (17). It maps the discrete parameter axis into the scale between the images:

$$s_i = e^{\frac{l}{m_0}} \quad (8^*)$$

Referring to the above, the method of matching interest points under an RST transformation, and use of a voting scheme to select the correct matches is described below. To match points under unknown transformation some robust similarity measure between image regions centred on the interest points is required. This section describes two similarity measures, one in the image domain and one in the frequency domain. These methods are correlation coefficient and phase correlation, both are well-known prior art, extensively investigated in the computer vision literature. A modification in the present embodiment involves using log-polar transformed image regions as described in the previous section, instead of using the original image regions. This gives not only the similarity measure but also an estimation of local transformation parameters (unknown rotation and scale) as a position of a largest peak in the correlation function surface (FIG. 11).

Figure 11:
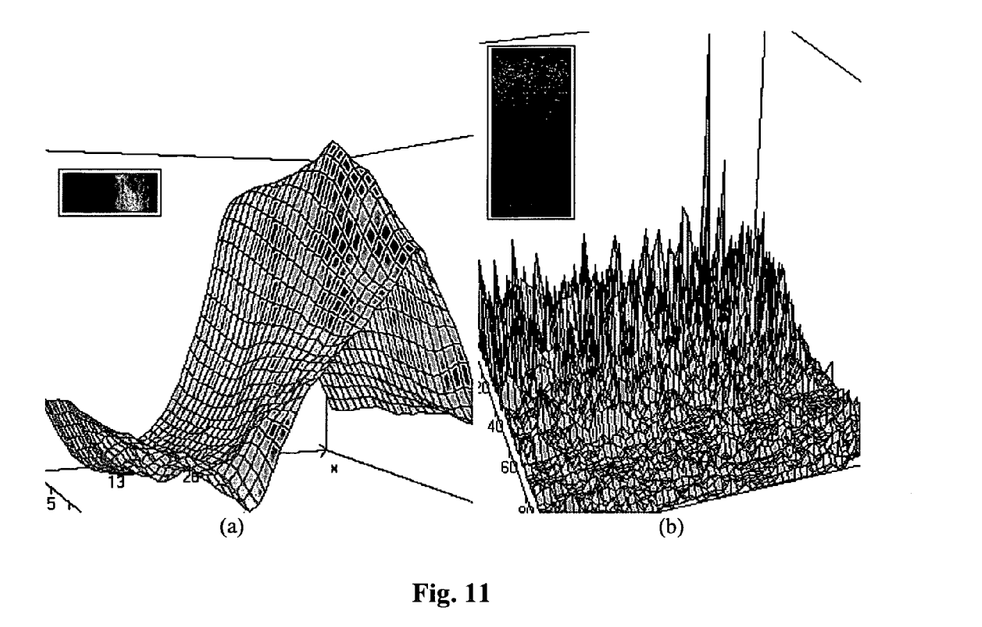

FIG. 11 shows the similarity measure as an image and as a surface. FIG. 11(a) illustrates the correlation coefficient; FIG. 11(b) illustrates phase correlation.

To measure the similarity of any point pair (i,j) the correlation coefficient between the corresponding log-polar images $I_i$ and $I_j$ is used:

$$C_{ij}(\theta_k, s_l) = \frac{\sum_{n,m} I_i(n, m)I_j(n+k, m+l) - N\overline{I_i I_j}(k, l)}{D_i D_j(k, l)}, \quad (18)$$

$$D_i = \left(\frac{\sum_{n,m} I_i^2(n, m) - }{N(\overline{I_i})^2}\right)^{1/2}, \quad D_j(k, l) = \left(\frac{\sum_{n,m} I_j^2(n+k, m+l) - }{N(\overline{I_j(k, l)})^2}\right)^{1/2},$$

$$\overline{I_i} = \frac{1}{N}\sum_{n,m} I_i(n, m), \quad \overline{I_j}(k, l) = \frac{1}{N}\sum_{n,m} I_j(n+k, m+l)$$

where $$\sum_{n,m}$$

means that summation is performed over all pixels of the reference image $I_i$;

$$N = \sum_{n,m} 1$$

is a total number of pixels in the reference image.

From analysis of (18) it can be seen that only the term $$\tilde{C}_{ij}(k, l) = \sum_{n,m} I_i(n, m)I_j(n+k, m+l) \quad (18^*)$$

is changing depending on the (i,j) pair and all other terms can be pre-computed in advance in the local preprocessing block (block 5.1).

Log-polar images are periodic in angle domain. It follows from the (17) that $I(n,m)=I(n+n_0, m)$. In our case the formula (18) has to be modified to account for the periodic nature of the parameter n. The following procedure is used to estimate local transformation:

1. Local pre-processing stage (block 5.1)

1.1 Create reference log-polar images with one period, i.e. $n_{max}=n_0-1$ in (17)

1.2 Create target log-polar images with two periods, i.e. $n_{max}=2*n_0-1$ in (17). Scale parameter domain is also extended to allow some search area: $m=0, \ldots, m_{max}+N_\theta$, where $N_\theta$ is defined in (7)

1.3 For all reference images compute $\overline{I_i}$, $D_i$ using (18).

1.4 For all target images and all indices (k,l) from the rotation-scale domain compute $\overline{I_j}(k,l)$, $D_j(k, l)$ using (18).

2. Matching stage (part of the block 5.2)

2.1 Search for best transformation parameters using (7)-(9*).

As an alternative, due to periodic nature of the log-polar image the phase correlation can be effectively used as the similarity measure. In the ideal case two correspondent log-polar images $I_i$ and $I_j$ differ only by translation $(k^*, l^*)$, so $$I_i(m,n)=I_j(m+k^*, n+l^*)$$

Applying standard phase correlation $$C_{ij} = F^{-1}\left\{\frac{F(I_i)F*(I_j)}{|F(I_i)F*(I_j)|}\right\} \quad (19)$$

where F(f) is 2D Fourier transform of an image f, F*(f) is a complex conjugation of F(f), a pulse function at the translation values is obtained:

$$C_{ij}(k,l)=\delta(k-k^*, l-l^*)$$

In practice the result of phase correlation is similar to what is shown in FIG. 11(b) and the translation values can be located by finding the highest peak.

For computation of similarity measure based on phase correlation the following algorithm is used:
1. Local pre-processing stage (block 5.1)
1.1 Create reference and target log-polar images using (17) and setting $n_{max}$ to be power of 2 minus 1. $I_{lp}(n,m)$ is zero-padded for $m > m_{max}$ so that vertical size of $I_{lp}$ is power of 2 and is greater then $2\ n_{max}$
1.2 Perform Fast Fourier Transform (FFT) for all log-polar images: $F(I_i) = FFT(I_i)$.
1.3 Normalize the result of FFT: $F_n(I_i) = F(I_i)/|F(I_i)|$
2. Matching stage (part of the block 5.2)
2.1 For all point pairs compute (19) as follows: for each complex pixel value $(a_i, b_i)$ and $(a_j, b_j)$ from with the same coordinates in $F_n(I_i)$ and $F_n(I_j)$ respectively obtain the phase-only complex image as follows:

$$(\phi_1, \phi_2) = (a_1 a_2 + b_1 b_2, a_2 b_1 - a_1 b_2) \quad (20)$$

2.2. Apply Inverse Fourier Transform to the phase image and search the highest peak (9*)

After performing clustering-based point matching as described in the previous sections the set of corresponding points can still have false matches (outliers). These outliers should be identified before computing the transformation between images, because they can significantly disturb the estimate of transformation parameters.

Referring to the above summary, the step of estimating a transformation model is described below.

The following model of the perspective transformation between two images is used:

$$x' = \frac{Ax + By + C}{Gx + Hy + I};$$
$$y' = \frac{Dx + Ey + F}{Gx + Hy + I} \quad (21)$$

If G=H=0, I=1 then the transformation is affine (22). By imposing constraints on the coefficients: A=sa, B=sb, C=−sb, D=sa, $a^2 + b^2 = 1$ (22) becomes the RST transformation (23) so six-parameter affine and four-parameter RST transformations are implicitly handled by this method.

$$x' = Ax + By + C;\ y' = Dx + Ey + F \quad (22)$$

$$x' = s(ax + by) + C;\ y' = s(-bx + ay) + F \quad (23)$$

Further simplification of the affine transformation by using A=E=1, B=D=0 leads to simplest two-parameter translational transformation (24), which is also implicitly handled by the proposed method.

$$x' = x + C;\ y' = y + F \quad (24)$$

Transformation (21) has 8 independent parameters (all parameters can be divided by I), which can be determined from 4 corresponding points (quadrilateral-to-quadrilateral mapping). For these points the (21) can be rewritten as a system of 8 linear equations, and it can be solved by any standard methods.

Figure 12:
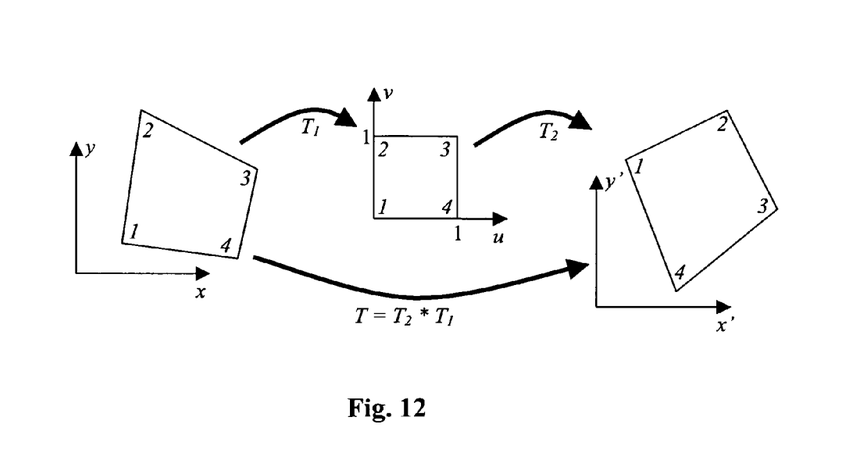
FIG. 12 illustrates a method of deriving a transformation.

There is another efficient prior art method for computing the parameters of (21). It is based of decomposition of general quadrilateral-to-quadrilateral transformation into two simple transformations quadrilateral-to-square and square-to-quadrilateral as shown in FIG. 12. These simple transformations are derived symbolically, so the solution of (21) based on four points is purely symbolic and it is much faster than straightforward 8×8 system solver. Its implementation consists only of simple arithmetic operations.

The general projective transformation is derived as the composition of two simple transformations.

Derivation of the general projective transformation as a composition of two simple transformations.

The RANSAC algorithm is applied to a set of corresponding points to estimate the projective transformation and the inlier correspondences, which are consistent with this transformation, thus rejecting outliers as mentioned above as part of the RANSAC procedure. RANSAC is a well-known procedure described, for example, in Chum, O., Matas, J. and Kittler, J.: Locally Optimised RANSAC, DAGM 2003.

1. All input correspondences are organized as a set of four-point samples, which are selected randomly.
2. Each such sample determines perspective transformation between images.
3. Each sample votes for its transformation by number of inlier correspondences (i.e. those which satisfy the transfer)
4. The transformation with the largest number of inliers is considered as a true transformation
5. The sample selection process stops if the solution is found, a threshold for proportion of outliers is used.

The final transformation (the result of the method) is computed by a known least squares estimation using all inlier correspondences, which works perfectly and gives accurate and statistically optimal estimation, when RANSAC rejects all outliers and only inliers remain.

Many alternative implementations of aspects of the proposed method exist. For example, different search constraints can be incorporated into the framework resulting in faster convergence. When the method is applied to a sequence of images (e.g. when dealing with image or video sequences), the image registration results and search constraints established in previous frames can be propagated to the successive frames.

Furthermore, many different similarity measures can be implemented for feature point local matching. The Correlation coefficient and phase correlation described in Section 5.3.7 are just two possibilities and many other alternatives exists.

A multi-resolution approach can be also applied in the feature extraction and/or matching stage.

Examples of applications of embodiments of the invention include registration of satellite images, airborne images, medical images or microscopic images; panorama and mosaic creation from images or video; and image sequence stabilization.

In the specification, the term image means a whole image or a region of an image, except where apparent from the context. Similarly, a region of an image can mean the whole image. An image includes a frame or a field, and relates to a still image or an image in a sequence of images such as a film or video, or in a related group of images.

The image may be a grayscale or colour image, or another type of multi-spectral image, for example, IR, UV or other electromagnetic image, or an acoustic image etc.

The invention is preferably implemented by processing electrical signals using a suitable apparatus.

The invention can be implemented for example in a computer system, with suitable software and/or hardware modifications. For example, the invention can be implemented using a computer or similar having control or processing means such as a processor or control device, data storage means, including image storage means, such as memory, magnetic storage, CD, DVD etc, data output means such as a display or monitor or printer, data input means such as a keyboard, and image input means such as a scanner, or any combination of such components together with additional components. Aspects of the invention can be provided in software and/or hardware form, or in an application-specific apparatus or application-specific modules can be provided, such as chips. Components of a system in an apparatus according to an embodiment of the invention may be provided remotely from other components, for example, over the internet.

The invention claimed is:

1. A computer-implemented method of estimating, using a processor, a transformation between a first image and a second image, comprising:
    extracting a plurality of interest points in the first image;
    defining a region of the first image around each of said extracted plurality of interest points in the first image;
    computing a local descriptor for each region of the first image;
    extracting a plurality of interest points in the second image;
    defining a region of the second image around each of said extracted plurality of interest points in the second image;
    computing a local descriptor for each region of the second image;
    using an area-based similarity measure and the computed local descriptors to estimate parameters of a local transformation between each region of the first image and each region of the second image, to derive a plurality of estimated local transformation parameters associated with respective pairs of interest points from the first image and the second image, wherein the similarity measure is invariant to rotation and scale;
    identifying a cluster of estimated local transformation parameters in the set of estimated local transformation parameters;
    determining pairs of interest points from the first image and the second image that are associated with the estimated local transformation parameters in the identified cluster; and
    providing the determined pairs of interest points for use in a robust estimator to derive a global transformation between the first image and the second image,
    wherein at least one of the above steps is performed by said processor.

2. The method of claim 1 wherein the estimation of local transformations is capable of estimating motion additional to or other than translation, such as rotation and/or change of scale.

3. The method of claim 1 wherein said estimation of local transformations involves a parametric model having more than 2 parameters.

4. The method of claim 1 comprising further processing using the set of estimated transformations to derive at least one global transformation.

5. The method of claim 4 wherein the further processing comprises using a robust estimator such as RANSAC.

6. The method of claim 5 wherein the further processing further comprises least-squares estimation.

7. The method of claim 1 comprising using a similarity measure for comparing regions.

8. The method of claim 7 using the similarity measure for an estimation of transformation parameters.

9. The method of claim 7 wherein the similarity measure involves a correlation coefficient or phase correlation.

10. The method of claim 7 comprising, for each of a plurality of regions in the first image, comparing the region with each of a plurality of regions in the second image, to derive a plurality of similarity measures.

11. The method of claim 10 comprising, for each of the regions in the first image, selecting M regions, where M>1, from the second image having the highest similarity measures.

12. The method of claim 11 using a voting scheme or accumulator for the plurality of local estimated transformations to identify the cluster of estimated local transformations.

13. The method of claim 12 comprising using the selected M regions in the voting scheme.

14. The method of claim 1 wherein the estimation of local transformations involves regions including feature or interest points, and matching of said regions and points.

15. The method of claim 14 wherein the estimation of local transformations involves, for each a plurality of points in the first image, matching the point and a surrounding local region with each of a plurality of points and a surrounding local image in the second image.

16. The method of claim 14 comprising using selected subset to select corresponding pairs of matched points in the first and second images.

17. The method of claim 14 comprising ordering the feature or interest points, each associated with a confidence measure, on the basis of confidence measure and location in the image.

18. The method of claim 1 comprising estimating the local transformations as rotation scale translation transformations.

19. The method of claim 1 comprising iterating the transformation estimations using search constraints, and modifying the search constraints.

20. The method of claim 1 comprising using a modified log polar transform of the image region, in which a log polar transform is applied to an area starting from a radial value $r_0$ where $r_0>0$.

21. The method of claim 1, using a multiscale representation of the images.

22. The method of claim 17 wherein the points are ordered for the purposes of matching.

23. The method of claim 17 wherein the ordering on the basis of location is ordering on the basis of distance between points.

24. The method of claim 23 wherein the points are ordered on the basis of decreasing distance between points.

25. The method of claim 17 wherein the points are ordered on the basis of decreasing confidence.

26. The method of claim 17 wherein initial points are representative of the spatial distribution of the points throughout the image.

27. The method of claim 17 comprising dividing the image into regions, and ordering the points according to confidence and region.

28. The method of claim 27 comprising ordering the points according to confidence in each region followed by ordering by region.

29. The method of claim 17 wherein the confidence measure reflects the strength of the feature or interest point.

30. The method of claim 17 wherein the confidence measure reflects the probability of the feature or interest point matching a feature or interest point in another image.

31. The method of claim 20 wherein the modified log polar transform is such that the inverse transform is of the form:

$$x=x_i+r\cos\alpha$$

$$y=y_i+r\sin\alpha$$

where $$r=e^\varrho+r_0.$$

32. Apparatus for estimating a transformation between a first image and a second image, comprising:
- means for extracting a plurality of interest points in the first image;
- means for defining a region of the first image around each of said extracted plurality of interest points in the first image;
- means for computing a local descriptor for each region of the first image;
- means for extracting a plurality of interest points in the second image;
- means for defining a region of the second image around each of said extracted plurality of interest points in the second image;
- means for computing a local descriptor for each region of the second image;
- means for using an area-based similarity measure and the computed local descriptors to estimate parameters of a local transformation between each region of the first image and each region of the second image to derive a plurality of estimated local transformation parameters associated with respective pairs of interest points from the first image and the second image, wherein the similarity measure is invariant to rotation and scale;
- means for identify a cluster of estimated local transformation parameters in the set of estimate local transformation parameters; and
- means for determining pairs of interest points from the first image and the second image that are associated with the estimated local transformation parameters in the identified cluster; and
- means for providing the determined pairs of interest points for use in a robust estimator to derive a global transformation between the first image and the second image.

33. A non-transitory computer-readable medium storing a computer program capable of being executed by a computer to perform the steps of:
- extracting a plurality of interest points in the first image;
- defining a region of the first image around each of said extracted plurality of interest points in the first image;
- computing a local descriptor for each region of the first image;
- extracting a plurality of interest points in the second image;
- defining a region of the second image around each of said extracted plurality of interest points in the second image;
- computing a local descriptor for each region of the second image;
- using an area-based similarity measure and the computed local descriptors to estimate parameters of a local transformation between each region of the first image and each region of the second image, to derive a plurality of estimated local transformation parameters associated with respective pairs of interest points from the first image and the second image, wherein the similarity measure is invariant to rotation and scale;
- identifying a cluster of estimated local transformation parameters in the set of estimated local transformation parameters;
- determining pairs of interest points from the first image and the second image that are associated with the estimated local transformation parameters in the identified cluster; and
- providing the determined pairs of interest points for use in a robust estimator to derive a global transformation between the first image and the second image.

34. The method of claim 1, wherein identifying a cluster in the set of estimated local transformations comprises:
- recovering parameters of the estimated local transformations for each pair of interest points;
- each pair of interest points voting for the recovered parameters; and
- identifying clusters of votes.

35. The method of claim 34, wherein a cluster of votes is identified by a peak in the accumulated voting for the recovered parameters.

* * * * *